May 16, 1933.                E. W. LITTLE                1,909,292
MECHANISM FOR CONSTRUCTING CAGES
Filed March 2, 1931              2 Sheets-Sheet 1
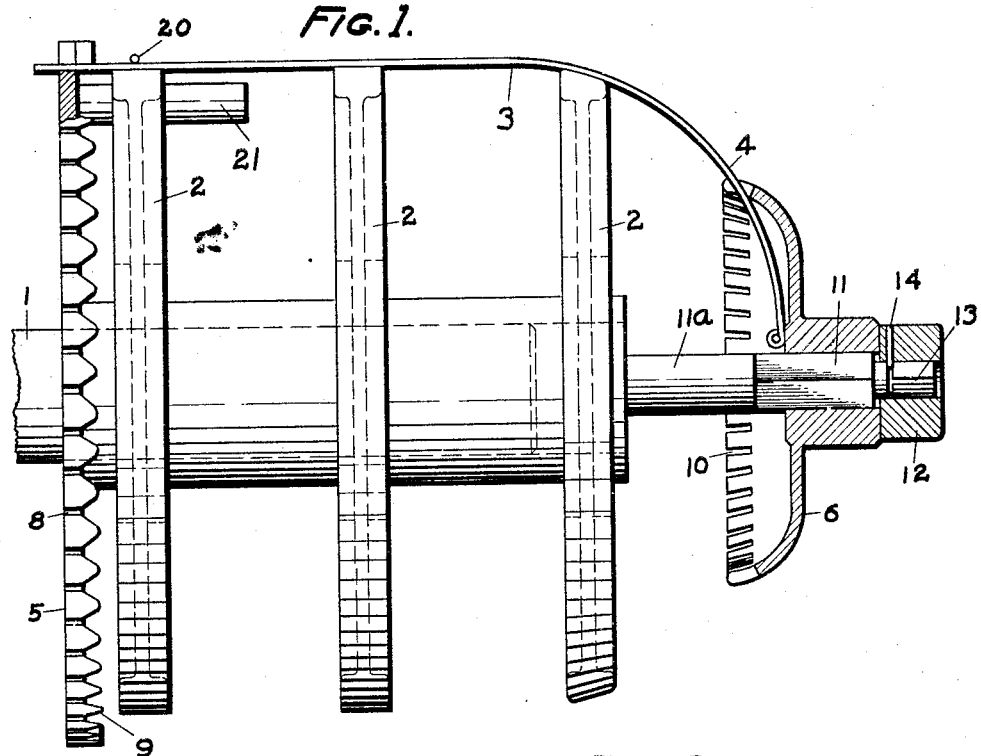
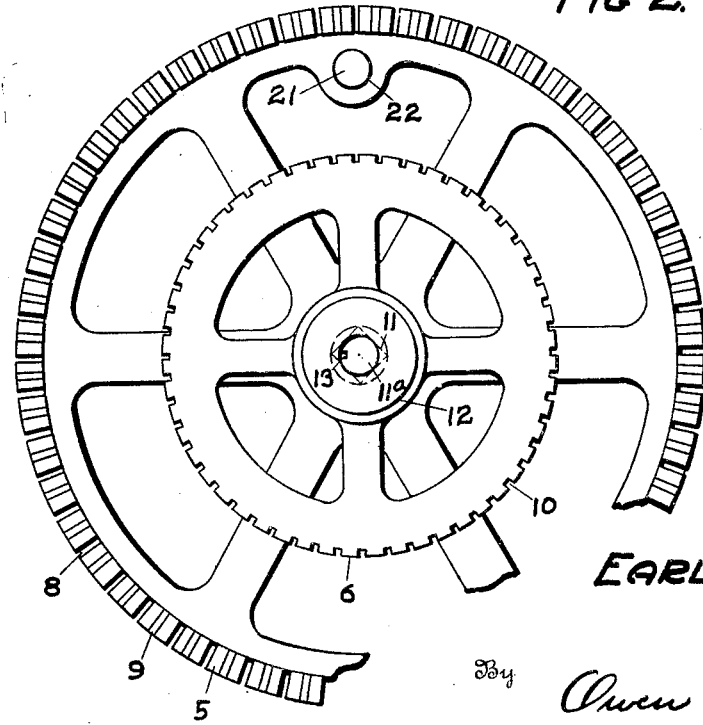
Inventor
EARL W. LITTLE
By Owen H. Spencer
Attorney May 16, 1933.  E. W. LITTLE  1,909,292

MECHANISM FOR CONSTRUCTING CAGES

Filed March 2, 1931  2 Sheets-Sheet 2

Inventor
EARL W. LITTLE
By Owen H. Spencer
Attorney

Patented May 16, 1933

1,909,292

UNITED STATES PATENT OFFICE

EARL W. LITTLE, OF INDIANAPOLIS, INDIANA

MECHANISM FOR CONSTRUCTING CAGES

Application filed March 2, 1931. Serial No. 519,452.

This invention relates to mechanism for constructing cages and is particularly designed for constructing bird cages, and one feature of the invention is the provision of electrodes adapted to support a cage structure while being welded together.

A further feature of the invention is the provision of means for holding the wires constituting the body of the cage in fixed spaced relation while being welded.

A further feature of the invention is the provision of means for locking the cage structure on the supporting means therefor.

A further feature of the invention is the provision of means for holding the wires of an elongated cage in spaced relation at both its ends and at suitable points between its ends.

Other objects and advantages will be hereinafter more fully set forth and pointed out in the accompanying specification.

In the accompanying drawings which are made a part of this application,

Figure 1 is a side elevation of the cage supporting means with parts thereof in section.

Figure 2 is an end elevation thereof.

Figure 3:
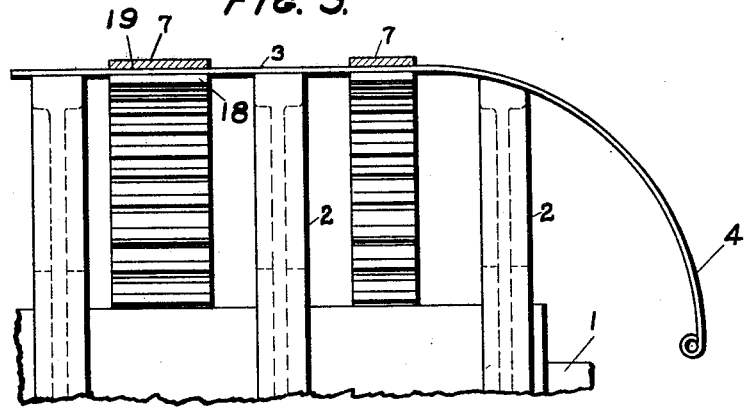
Figure 3 is a fragmentary elevation of the cage supporting element showing a different form of spacing element in section.

Referring to the drawings in which similar reference numerals designate corresponding parts throughout the several views, the numeral 1 designates a shaft of that type associated with a conventional spot welding machine, on which are mounted ring like electrodes 2, which may be integrally connected or in separated relation.

Figure 4:
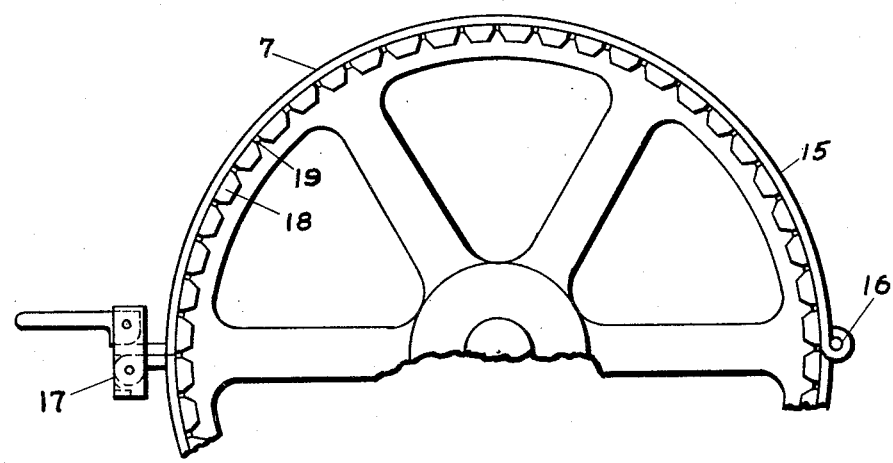
Figure 4 is an edge elevation of that form of spacing element shown in Fig. 3, as applied to use, and, Figure 5 is a front elevation of the fastening means for the spacing element.
Figure 5:
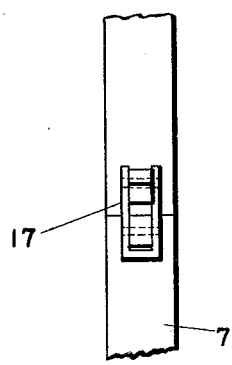

In constructing cages of this nature, it is customary to assemble the body forming wires 3 of the cage and secure them together at the crown end 4 thereof, said assemblage of wires being introduced over the electrodes 2, which electrodes form a support for the cage while the same is being welded together. After the wires 3 have been introduced over the electrodes 2, spacer members are applied to the wires to hold them in spaced relation, which may comprise disc like members 5 and 6, as shown in Figs. 1 and 2, or in the form of a belt structure 7 as shown in Figs. 3 and 4, or both, the disc 5 being slidable on the shaft 1 and having notches 8 in the peripheral edge thereof to receive the respective wires 3, the face of the disc toward the electrodes having tapered guides 9 between the notches 8 for guiding the wires into the notches.

The disc 6 is arranged and shaped to correspond to the curved crown 4, with the peripheral edge thereof provided with a plurality of notches 10 for engagement with the wires 3, when the disc 6 is moved inwardly on the squared portion 11 of a shaft 11a. After the disc 6 is properly engaged with the wires 3, a locking collar 12 is introduced over the projecting end of the shaft 11a, said projecting end having grooves 13 with which engages a pin 14 carried by the collar 12 and by means of which the collar is locked on the shaft, the shaft 11a being connected with the electrodes 2.

Either the discs 5 and 6, or the belt structure 7 may be used to hold the wires 3 spaced apart under ordinary conditions, but when an elongated cage is being welded, it is necessary to provide spacing elements at intervals in the length of the cage as well as at the ends thereof, in which instance both the discs 5 and 6 are used as well as the belt structures 7, one or more of the belt structures being introduced around the cage forming wires 3 between the ends of the cage structure.

By reinforcing the cage wires in this manner and mounting the cage on a supporting element as shown, the cage wires will be firmly and rigidly held while being welded together, regardless of the length or diameter of the cage.

The belt structure 7 preferably comprises a pair of semi-circular bands 15, having hinged connection 16 at one end, while the opposite ends are secured together by any suitable locking means 17, or the belt structure may consist of a continuous flexible member having any suitable means for securing the ends thereof together. Attached to the inner face of the belt structure 7 are a plurality of spacing blocks 18, which are so arranged that notches 19 will be formed between the blocks to receive the wires 3 of the cage structure and, as shown in Fig. 3, belt structures of different widths may be used, if desired.

By providing the spacing elements, the wires 3 will be held in uniform spaced relation while bands 20 are being welded thereto and by providing a plurality of electrodes, all the bands 20 may be applied at one operation, or they may be applied singly by shifting the electrodes successively to bring them into welding position.

The disc 5 is held stationary with the electrodes 2 in any suitable manner, as by extending an elongated pin 21, on the disc 5, through an opening 22 in the web of one of the electrodes, and as the disc 6 is also held in fixed relation with the electrodes, the notches in the two discs will always be aligned to receive the wires 3 of the cage structure, when moved inwardly toward the end portions of the wires.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. Means for holding a plurality of assembled cage forming wires in spaced relation, comprising a belt like structure, spacing elements associated therewith forming wire receiving channels with substantially parallel sides, and means for locking the belt like structure in engagement with the cage forming wires.

2. Means for holding a plurality of assembled cage forming wires in spaced relation while being welded comprising a supporting element, and a non-stretchable notched means adapted to be engaged with said wires between their ends and externally of the cage as a whole after the cage structure has been placed on its supporting element.

3. A means for holding a plurality of assembled cage forming wires in spaced relation, comprising a non-stretchable belt-like structure, spacing elements associated therewith forming wire locating channels, and means for rigidly uniting the ends of said belt-like structure whereby the spacing elements near one end thereof will be properly spaced from the spacing elements near the other end thereof.

4. A cage assembling tool comprising a non-stretchable belt having equally spaced wire locating notches formed on its inner surface, for locating the cage wires, said belt being constructed of segments, and means to swing said segments apart for removing same from the assembled wires.

5. In the constructing of bird cages the combination with a cage supporting mechanism having an arbor concentric with the normally vertical center of a cage constructed thereon, and wire spacing elements on said arbor, a spacing element for the cage guided by said arbor and serving to be moved from a position externally of the cage co-directionally with the normally vertical center of the cage into engagement with cage forming wires, and means embodied with said arbor serving to retain said spacing element in wire engaging position.

In testimony whereof, I have hereunto set my hand on this the 16th day of February, 1931.

EARL W. LITTLE.